US008917584B1

(12) United States Patent
Lee et al.

(10) Patent No.: US 8,917,584 B1
(45) Date of Patent: *Dec. 23, 2014

(54) SYSTEMS AND METHODS FOR COMPUTING A RELATIVE PATH DELAY BETWEEN MULTIPLE TRANSMISSION SOURCES (71) Applicant: Marvell International Ltd., Hamilton (BM)

(72) Inventors: Jungwon Lee, San Diego, CA (US); Jiwoong Choi, Mountain View, CA (US); Jihwan P. Choi, Daegu (KR)

(73) Assignee: Marvell International Ltd., Hamilton (BM)

( * ) Notice: Subject to any disclaimer, the term of this patent is extended or adjusted under 35 U.S.C. 154(b) by 34 days.

This patent is subject to a terminal disclaimer.

(21) Appl. No.: 13/751,707

(22) Filed: Jan. 28, 2013

Related U.S. Application Data

(63) Continuation of application No. 12/835,904, filed on Jul. 14, 2010, now Pat. No. 8,379,508, which is a continuation of application No. 12/176,976, filed on Jul. 21, 2008, now Pat. No. 7,782,751.

(60) Provisional application No. 60/954,669, filed on Aug. 8, 2007.

(51) Int. Cl.
*H04J 11/00* (2006.01)
*H04J 3/06* (2006.01)
*H04W 40/38* (2009.01)

(52) U.S. Cl.
CPC .................................. *H04W 40/38* (2013.01)
USPC ............................ 370/206; 370/252; 370/350

(58) Field of Classification Search
None
See application file for complete search history.

(56) References Cited

U.S. PATENT DOCUMENTS

| | | | |
|---|---|---|---|
| 6,728,538 B2 | 4/2004 | Jou et al. | |
| 6,944,466 B2 | 9/2005 | Bi et al. | |
| 7,151,948 B2 | 12/2006 | Ishii et al. | |
| 7,508,862 B2 | 3/2009 | Bilgic et al. | |
| 7,782,751 B1 | 8/2010 | Lee et al. | |
| 2007/0123258 A1 | 5/2007 | Sawyer | |
| 2008/0095256 A1* | 4/2008 | Primo et al. | 375/260 |
| 2008/0095275 A1* | 4/2008 | Primo et al. | 375/326 |
| 2008/0155093 A1 | 6/2008 | Dharmistan | |
| 2008/0192682 A1 | 8/2008 | Matsumoto et al. | |
| 2009/0054075 A1 | 2/2009 | Boejer et al. | |
| 2009/0323515 A1 | 12/2009 | Ishikura et al. | |
| 2010/0118849 A1 | 5/2010 | Kimura | |
| 2010/0248664 A1 | 9/2010 | Dent | |

* cited by examiner

*Primary Examiner* — Chi H Pham
*Assistant Examiner* — Soon-Dong D Hyun (57) ABSTRACT

Systems and methods are provided for computing a relative path delay between multiple transmitting source to select a source that is closest to a receiving device. Preamble sequences unique to each source are received by a receiving device. The receiving devices determines based on a channel estimation or differential algorithm which transmitting source is closer to the receiving device. The channel estimation algorithm computes the path delay based on a channel estimation correlation at different preamble sequence indices. The differential algorithm computes the path delay based on a correlation between the received and transmitted preamble sequences at different preamble sequence indices. The receiving device selects the closer of the multiple sources to be the source from which to extract data.

20 Claims, 8 Drawing Sheets

SYSTEMS AND METHODS FOR COMPUTING A RELATIVE PATH DELAY BETWEEN MULTIPLE TRANSMISSION SOURCES

CROSS REFERENCE TO RELATED APPLICATIONS

The application is a continuation of U.S. patent application Ser. No. 12/835,904, filed Jul. 14, 2010, which is a continuation of U.S. patent application Ser. No. 12/176,976, filed Jul. 21, 2008, now U.S. Pat. No. 7,782,751, which claims the benefit of U.S. Provisional Application No. 60/954,669, filed Aug. 8, 2007, each of which is hereby incorporated by reference herein in its entirety.

BACKGROUND OF THE INVENTION

The present invention is directed to systems and methods for computing a relative path delay between multiple transmission sources, and more particularly to selecting a source which is closest to the receiving device based on a relative path delay estimation in orthogonal frequency division multiplexing (OFDM) systems.

Typically, a receiver (i.e., a mobile station (MS)) in a multiple transmission source (i.e., multiple base stations (BS)) system receives the same data signal from each transmission source and has to select one of the transmission sources to be the serving transmission source (i.e., the source from which the data is extracted and utilized). The receiver measures the power of each received signal (e.g., using a measure of Received Signal Strength Indicator (RSSI)) and selects the transmission source of the signal having the largest amount of power to be the serving transmission source.

However, because power of a signal received at a device does not correlate well with the distance to the transmission source from which the signal originated, these systems lack the capability to select the transmission source that is closest to the receiver. Additionally, although the transmission sources are synchronized to transmit the signals at the same time, the time at which the signals are received depends on the path delay between the receiver and the transmission sources. Thus, because these systems do not take into account distance when selecting a particular serving transmission source, the closest transmission source is not always selected which negatively impacts performance.

Accordingly, it is desirable to provide enhanced systems and methods for selecting a closest serving transmission source among multiple transmission sources to improve performance.

SUMMARY OF THE INVENTION

In accordance with the principles of the present invention, systems and methods are provided for computing a relative path delay for multiple transmission sources, and more specifically for computing distances and path delays between the transmission sources in order to improve overall performance of OFDM systems.

Signals from multiple base stations (e.g., multiple sources) may be received by a mobile station (e.g., a receiving device). The mobile station may need to select the closest signal as its source of data in order to improve performance. Each source is identified with a unique preamble sequence that is known to the receiving device (e.g., preamble sequence defined by the WiMax standard).

Based on the preamble sequence that is received at the receiving device, an algorithm may be performed to determine the distance or path delay to the transmitting source. In some embodiments, the receiving device computes the path delay of each one of the sources based on a channel estimation algorithm. The channel estimation algorithm correlates the channel estimate associated with a preamble sequence of a base station with the channel estimate evaluated at a shifted index value of the preamble sequence. The path delays are then compared to determine which one of the sources is closer to the receiving device.

In some embodiments, the receiving device computes the path delay of each one of the sources based on a differential algorithm. The received preamble sequence is correlated with the received preamble sequence evaluated at a shifted index value of the received preamble sequence. Similarly, the transmitted preamble sequence is correlated with the transmitted preamble sequence evaluated at a shifted index value of the transmitted preamble sequence. The transmitted preamble sequence correlation and the received preamble sequence correlation are then correlated with each other to determine the path delay. In particular, the magnitude of the transmitted and received preamble sequence correlation provides the RSSI of the signal associated with a particular source and the phase of the transmitted and received preamble sequence correlation provides the path delay to the particular source. The path delays are then compared to determine which one of the sources is closer to the receiving device.

The signal from the closer of the multiple sources is selected to be the serving source (e.g., the source from which data is extracted). For example, the receiving device may switch from one source to another if it determines (based on the channel estimation algorithm or differential algorithm) that one source is closer to the receiving device than the other.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This invention generally relates to relative path delay measurement for a system having multiple transmission sources. For illustrative purposes, this invention will be described in the context of a WiMax system (i.e., IEEE 802.16 standard) but it should be understood that the teachings of the invention can be applied to any system having multiple transmission sources, such as WiFi, cellular systems, GPS systems, and the like.

Figure 1:
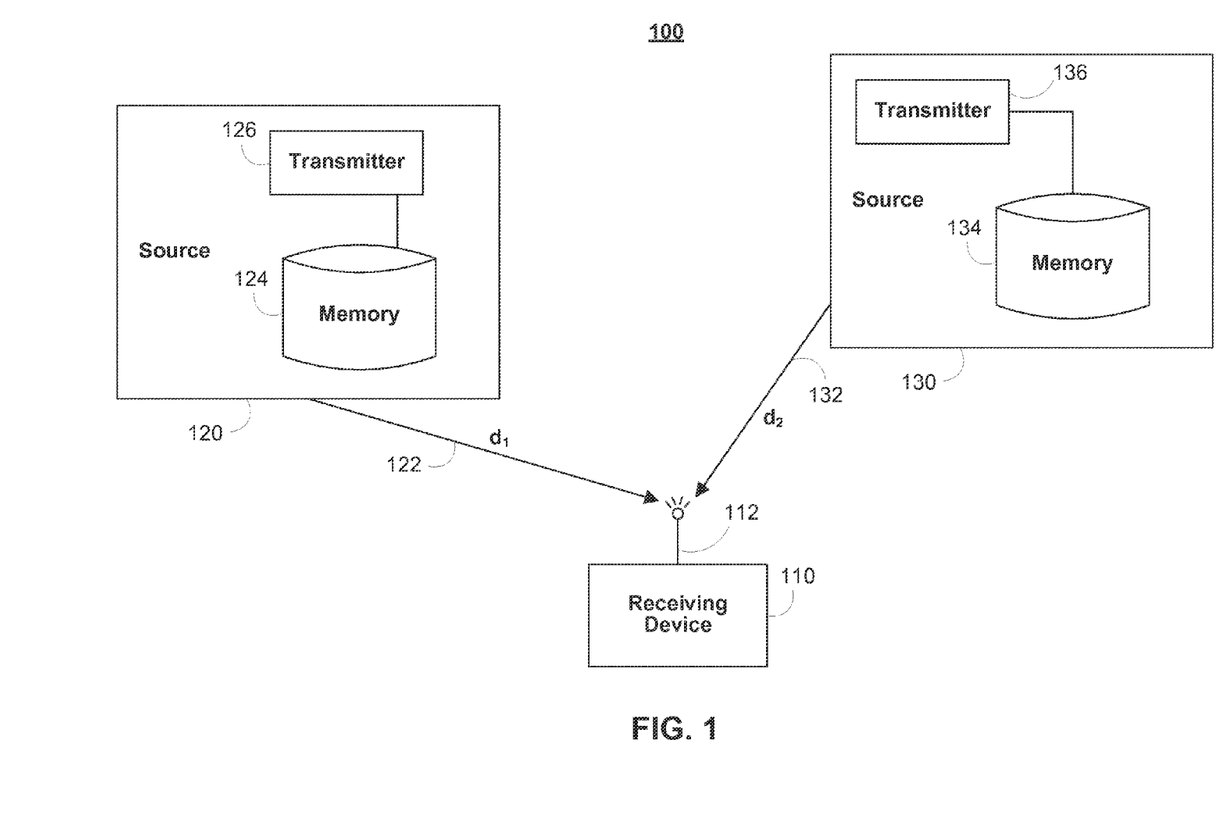
FIG. 1 is a diagram of an illustrative relative path delay measurement system in accordance with an embodiment of the present invention.

FIG. 1 is a diagram of an illustrative relative path delay measurement system 100 in accordance with an embodiment of the present invention. System 100 includes transmission sources 120 and 130 (which may be referred to below as base stations (BS) 120 and 130) and a receiving device 110 (which may be referred to below as mobile station (MS) 110).

Each base station 120 and 130 communicates with mobile station 110 through a respective transmission link 122 and 132. Transmission link 122 or 132 may be any wireless communication path such as WiFi, WiMax, BlueTooth, or the like. Mobile station 110 receives the signals transmitted from each base station through one or more antennas 112. In some implementations, the base stations 120 and 130 transmit the data signals in a multiple input multiple output (MIMO) fashion. In such circumstances, mobile station 110 may have multiple antennas 112 for receiving signals from each of base stations 120 and 130. This will be discussed in more detail below.

Base station 120 may be at a distance $d_1$ away from mobile station 110. Base station 130 may be at a farther distance $d_2$ away from mobile station 110 than base station 120. Mobile station 110 may initially communicate with base station 130 and as such the base station is referred to as the serving base station (or anchor base station). When mobile station 110 encounters a signal from a second base station (e.g., base station 120), mobile station 110 may compute a relative path delay between the two base stations to determine which base station 120 or 130 is closer.

For example, mobile station 110 may assign a relative value of '0' to the serving base station (e.g., base station 130). Mobile station 110 may then determine the relative path delay by computing the difference between the distances $d_1$ and $d_2$ to each base station and divide that difference by c (i.e., the speed of light) and assign the relative path delay to the newly encountered base station 120. If the relative path delay is positive, then mobile station 110 may determine that the base station 120 is farther away from base station 130. Accordingly, mobile station 110 may not hand-over the signal to the newly encountered signals from base station 120. However, if the relative path delay is negative, then mobile station 110 may determine that the base station 120 is closer than base station 130 and may hand-over the signal to the newly encountered signals from base station 120.

It should be understood, that although the relative path delay was described above in the context of hand-over, the relative path delay between two or more base stations to a mobile station can also be used for fast-base station switching (FBSS) or macro-diversity handover (MDHO).

Each base station 120 and 130 includes respective transmitter circuitries 126 and 136. Each base station 120 and 130 also includes a respective memory 124 and 134. Transmitter circuitries 126 and 136 transmit the data signals with a respective preamble sequence that identifies the transmitter (and thereby the base station) from which the data signal originate. In particular, transmitter circuitry 126 and 136 may transmit data signals in accordance with the OFDM standard. Memories 124 and 134 store preamble sequences that may be needed to generate the transmitted signals.

The preamble sequence used to identify each base station 120 and 130 may be a preamble OFDM symbol unique to the base station. For example, as discussed in more detail below, each base station transmits data in a set number of frames and each frame is prefaced with a preamble symbol unique to the transmitter. The mobile station (i.e., the receiving device) can identify a base station based on the unique preamble symbol associated with that base station.

Base stations 120 and 130 may communicate with each other in order to synchronize the transmitted signals. In particular, each base station may be synchronized such that the signals are transmitted substantially at the same time. If the signals were not synchronized, the relative path delay computation may lead to inaccurate results. However, in some implementations, if the transmitted signals are not synchronized, the signals may be time-stamped to enable the mobile station 110 to compensate for the transmission delay added by lack of synchronization. Compensating for such transmission delay may enable the mobile station to compute the relative path delay (and thereby the distance to each base station) even though the signals are not synchronized.

Mobile station 110 may include a memory that stores at least one OFDM symbol whose frequency domain values are known to mobile station 110. This symbol may be referred to below as the transmitted preamble OFDM symbol. In particular, mobile station 110 may be configured to know what signal should be transmitted from a base station based on a predefined standard (i.e., WiMax). Mobile station 110 may compute the path delay to a base station based on a comparison between the expected signal (i.e., the transmitted signal X(t)) and the actually received signal Y(t).

Each transmitter 126 and 136 transmits a signal $X_i[k]$ corresponding to a preamble sequence i at subcarrier k. In WiMax, the transmitted signal $X_i[k]$ has values of +1 and −1 at the preamble subcarrier set corresponding to a given segment and has values of 0 at other subcarriers. In particular, a preamble sequence in the WiMax standard typically includes three subcarrier sets such that three different indices of k are selected for transmission in the preamble sequence.

For example, as discussed above, each transmitter 126 and 136 inserts a preamble OFDM symbol at the start of each frame of data. To generate the preamble OFDM symbol, the transmitters select one of 114 preamble sequences (i.e., in the case of a 1024 or 512 FFT mode) based on the particular IDCell number of the base station and the segment number. For example, memories 124 and 134 may store a table for providing the particular preamble sequence to generate. The table may include columns for the index k, the IDcell number of the base station, the segment number (for each of the three transmitted segments in WiMax) and the sequence of hexadecimal bits for the preamble sequence. The transmitter may address a particular row in the table (based on the index, IDcell and segment number) to retrieve the appropriate preamble sequence for transmission.

The subcarriers are modulated (e.g., using phase shift keying (PSK) modulation) with the selected preamble sequence. In some implementations, only one out of every three subcarriers is modulated. For example, the preamble subcarrier set for segment n may be computed in accordance with $PreambleCarrierSet_n=n+3*k$ where k is an integer between 0 and 283 for a 1024 FFT and is an integer between 0 and 142 for 512 FFT. 86 guard subcarriers may be inserted on the left and right sides of the spectrum for a 1024 FFT and 42 guard subcarriers may be inserted on the left side and 41 on the right for a 512 FFT. In some implementations, the power may be increased by, for example, eight times. Preamble modulation techniques are described in more detail in H. Arslan, *Signal Processing Communications Handbook*, CRC Press, 2004 and T. Yucek and H. Arsland, *Delay spread and time dispersion estimation for adaptive OFDM systems*, Proc. IEEE WCNC, pp. 1433-1438, April 2006, each of which is hereby incorporated by reference herein in its entirety.

The modulated subcarriers are converted to a time-domain signal using, for example, an Inverse Fast Fourier Transform for transmission. Finally, a cyclic prefix is added to the time-domain signal.

The received preamble symbol Y[k] of the k-th subcarrier received by mobile station 110 may be represented in the frequency domain as follows:

$$Y_1[k] = \sum_{i=0}^{I-1} H_{1,i}[k]X_i[k] + Z_1[k]$$

$$\vdots$$

$$Y_R[k] = \sum_{i=0}^{I-1} H_{R,i}[k]X_i[k] + Z_R[k]$$

where k is the subcarrier index, i is the preamble sequence number which is the base station index number that represents the unique identifier of the base station, I is the total number of distinct preamble sequences (i.e., 114 for 1024 FFT), R is the number of receiver antennas in the mobile station (e.g., if more than one antenna is used in a MIMO implementation), $Y_r[k]$ and $Z_r[k]$ represent the received signal and noise (plus interference), respectively, of the antenna r at the subcarrier k, and $H_{r,i}[k]$ represents the channel gain from the base station with the i-th preamble sequence to antenna r at subcarrier k. As discussed above, $X_i[k]$ is the transmitted signal corresponding to the preamble sequence i associated with a particular base station at subcarrier k. Since mobile station 110 knows the transmitted values of $X_i[k]$, mobile station 110 may compare the expected transmitted values $X_i[k]$ with received values $Y_R[k]$ to compute the relative path delay estimation as discussed in more detail below in connection with FIGS. 2-4.

The preamble sequence corresponding to i=0 may denote the serving base station while all other i values denote base station signals acquired by the mobile station from other base stations.

Mobile station 110 may compute the relative path delay estimation based on the signals received from two or more base stations 120 and 130. In particular, mobile station 110 may communicate with a serving base station and when mobile station 110 acquires a signal from a new base station, mobile station 110 may compare the path delays to select the signal from the closest base station. Mobile station 110 may compute the relative path delay based on either a channel estimation algorithm or a differential algorithm. The algorithms for computing the relative path delay are discussed in more detail in connection with FIGS. 3 and 4.

Figure 2:
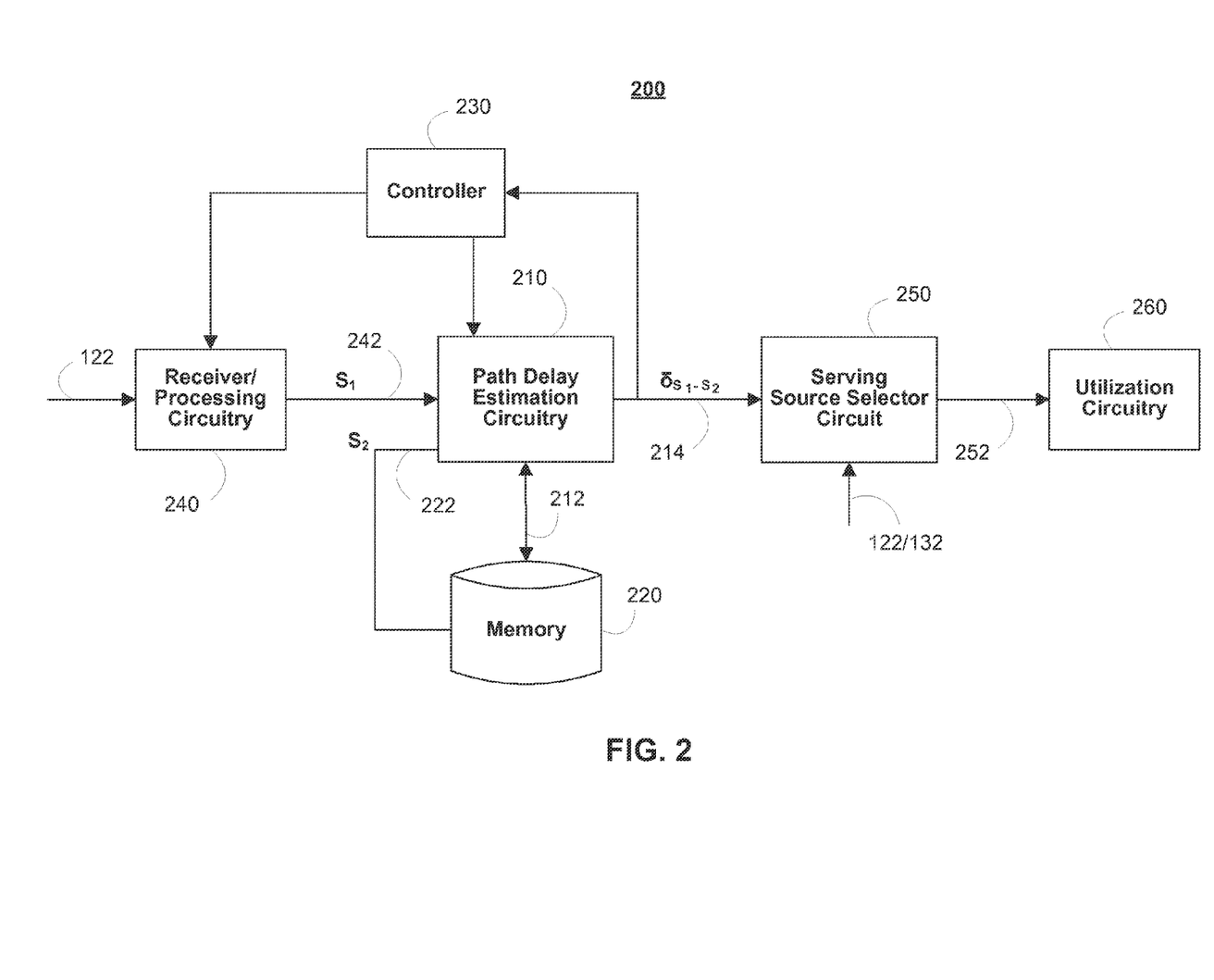
FIG. 2 is a diagram of an illustrative relative path delay estimation circuit in accordance with an embodiment of the present invention.

FIG. 2 is a diagram of an illustrative relative path delay estimation circuit 200 in accordance with an embodiment of the present invention. Relative path delay estimation circuit 200 may be implemented in mobile station 110. Relative path delay estimation circuit 200 may include a controller 230, a receiver/processing circuit 240, a memory 220 and a path delay estimation circuit 210. Although each component is illustrated in FIG. 2 separately, it should be understood that the components may be combined into one or more different devices or components.

Controller 230 may receive an indication in the form of an interrupt from, for example, receiver/processing circuit 240 indicating that a new base station signal has been detected or acquired. For example, mobile station 110 may be communicating with base station 120. Upon detecting or acquiring a signal from another base station 130 (e.g., because mobile station 110 moves around and may be in range of receiving signals from another base station), receiver 240 may instruct controller 230 to conduct a relative path delay analysis. This may be done to determine which base station 120 or 130 is closer to mobile station 110 in order to select the signals from the closer base station.

Controller 230 may instruct path delay estimation circuit 210 to perform an algorithm to determine which base station is closer. Path delay estimation circuit 210 may perform a channel estimation algorithm or a differential algorithm to determine which base station is closer. Receiver/processing circuit 240 may compute a Fast Fourier Transform (FFT) and various other operations to retrieve the preamble sequence from the received signal 122. Receiver/processing circuit 240 may also compute and provide the conjugate (denoted by '*') of the preamble sequence. The preamble sequence and its conjugate may be stored in memory 220.

Path delay estimation circuit 210 may receive the received signal preamble sequence (S1) (and its conjugate if necessary) corresponding to the newly acquired signals 122 from the base station through communications link 242. Alternatively, path delay estimation circuit 210 may retrieve the preamble sequence corresponding to signals 122 from memory 220. Path delay estimation circuit 210 may also retrieve the preamble sequence (S2) corresponding to the serving base station signals 132 from memory 220 through communications link 222.

A table that includes predefined preamble sequences (e.g., by the WiMax standard) for various base stations and segment identifiers may also be stored in memory 220. Storing this information in memory 220 may enable mobile station 110 to know what are the expected transmitted preamble sequences (or what the transmitted preamble sequences should be) for each received signal. Path delay estimation circuit 210 may retrieve this information from memory 220 by providing the appropriate table indices (or address signals) 212.

Path delay estimation circuitry 210 may compute the relative path delay 214 between the two base stations based on the received and transmitted signals and by applying either the channel estimate or differential algorithm. For example, path delay estimation circuitry 210 may compute the difference between the two distances of each base station 120 and 130 (determined based on the phase angles) and determine which base station is closer to mobile station 110. Path delay estimation circuitry 210 provides the relative path delay 214 to controller 230. Controller 230 may switch from one serving base station 130 to another base station 120 if it determines that the newly acquired signals from base station 120 are closer to mobile station 110 than the signals from serving base station 130.

Relative path delay estimation circuit 200 may also include a serving source selector circuit 250 and a utilization circuit 260. Serving source selector circuit 250 receives the computed path delay 214 and selects the base station closest to mobile station 110 to be the serving base station. For example, serving source selector circuit 250 may receive the signals 122/132 from multiple base stations. Based on the determination of the relative path delay between the base stations, serving source selector circuit 250 selects one of the signals 122/132 to provide to a utilization circuit 260 via communications link 252. Utilization circuit 260 may retrieve the data from the selected signal and perform a variety of computations on the data. For example, utilization circuit 260 may compute an FFT, IFFT, various signal processing operations, voice retrieval computations, or the like.

Figure 3:
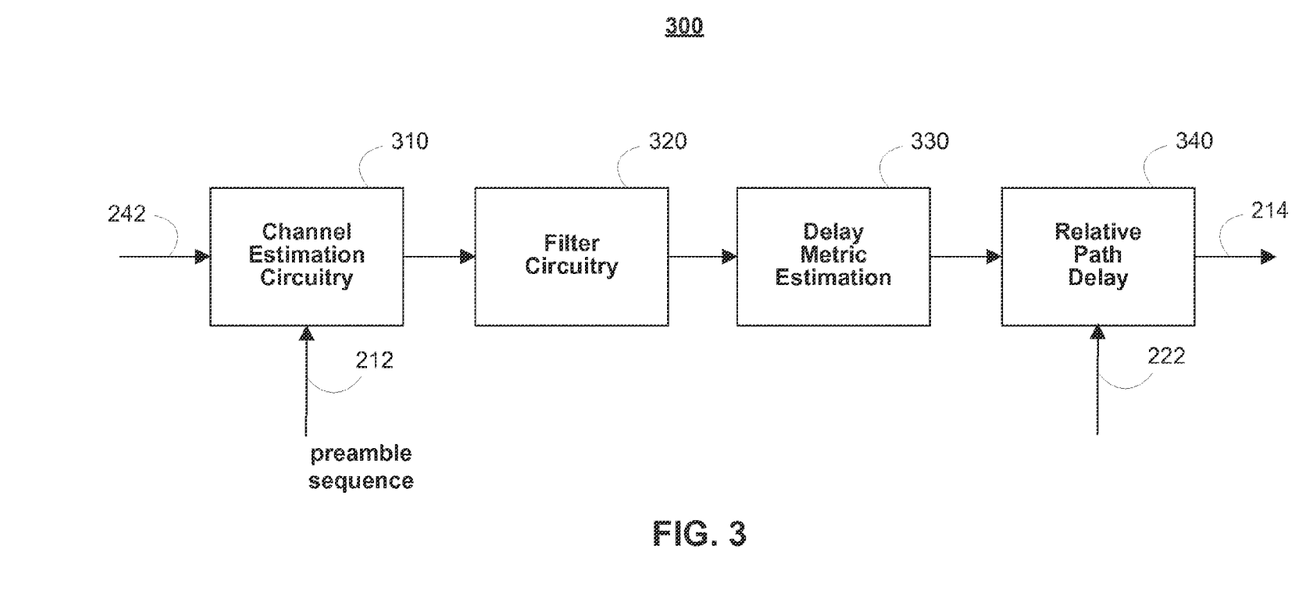
FIGS. 3 and 4 are more detailed diagrams of a relative path delay estimation circuits in accordance with an embodiment of the present invention.

FIG. 3 is a detailed diagram of a channel estimation based relative path delay estimation circuit 300 in accordance with an embodiment of the present invention. In some embodiments, relative path delay estimation circuit 210 computes the path delay between two or more signals using channel estimation based relative path delay estimation circuit 300.

Channel estimation based relative path delay estimation circuit 300 may include a channel estimation circuit 310, filter circuitry 320, delay metric estimation circuit 330 and relative path delay circuitry 340. Channel estimation circuit 310 receives the preamble sequence 242 $Y_r[k]$ corresponding to a base station received signal from receiver 240 (FIG. 2). Channel estimation circuit 310 also receives from memory 220 (FIG. 2) the expected (or transmitted) preamble sequence 212 $X_j^*[k]$ (in conjugate form) that corresponds to the base station j. Alternatively, channel estimation circuit 310 may receive the expected (or transmitted) preamble sequence 212 in regular form and compute the conjugate.

Channel estimation circuit 310 computes the initial channel estimate for the preamble sequence j associated with a signal received from base station 120 or 130. For example, channel estimation circuit 310 may compute the initial channel estimate in accordance with the following:

$$H_{r,j,init}[k] = Y_r[k] X_j^*[k] \text{ for } k \in P_j$$

where $P_j$ is the set of the indices of subcarriers used for the preamble sequence associated with the base station and r identifies a particular one of R antennas. For example, in WiMax implementations, the $P_j$ set would include three different values. Accordingly, three different initial channel estimates may be computed, one for each preamble sequence subcarrier index.

Channel estimation circuit 310 may provide the computed initial channel estimate H to filter circuitry 320. Filter circuitry 320 may be used to combine all of the computed initial channel estimates associated with each preamble sequence subcarrier index. For example, in WiMax implementations, filter circuitry 320 may accumulate the three initial channel estimates that are computed.

Filter circuitry 320 may use a variety of computations to combine the initial channel estimates received from channel estimation circuitry 310. For example, filter circuitry 320 may implement any linear filter, where the linear minimum mean square error is used. Alternatively, filter circuitry 320 may implement a 3-tap (or any size tap) local average filter or maximum likelihood channel estimation algorithm to compute the final channel estimate.

In general terms, filter circuitry 320 may compute the final channel estimate based on the initial channel estimate in accordance with the following:

$$\hat{H}_{r,j}[m] = \sum_{k \in P_j} a_{m,k} H_{r,j,init}[k]$$

where $\hat{H}_{r,j}[m]$ is the final channel estimate at the subcarrier m and $a_{m,k}$ is a filter coefficient.

The final channel estimate is provided to delay metric estimate circuit 330 for computing the relative path delay. For example, delay metric estimate circuit 330 may correlate the final channel estimate at the received subcarrier values k with the final channel estimate a shifted subcarrier values (k−q). The correlation may be performed and accumulated for each receiving antenna 112 (represented by r). For WiMax implementations, the final channel estimate is correlated with a final channel estimate at a subcarrier value shifted by three.

In general terms, delay metric estimate circuit 330 may compute the path delay associated with base station 130 (represented by j) in accordance with the following:

$$\hat{\theta}_{j,chan} = -\frac{N}{2\pi q} \angle \left( \sum_{r=1}^{R} \sum_{m \in \tilde{P}_j} \hat{H}_{r,j}^*[m] \hat{H}_{r,j}[m+q] \right)$$

where $\hat{\theta}_{j,chan}$ is the path delay corresponding to base station j, R is the number of receiver antennas (this may be unnecessary if only one antenna 112 is presented (e.g., in non MIMO based systems), $\tilde{P}_j$ is the set of indices of subcarriers used for preamble sequence j excluding the highest subcarrier index and $\hat{H}_{r,j}$ is the final channel estimate provided by filter circuitry 320 or in some implementations directly from channel estimation circuitry 310 (e.g., when no filter is necessary).

The relative path delay is computed based on the path delay computed by delay metric estimate circuit 330. Relative path delay computation circuit 340 receives the computed path delay associated with a particular base station (e.g., base station j or base station 130) from delay metric estimate circuit 330 and compares it with a path delay associated with another base station (e.g., a serving base station j=0 or base station 130). For example, relative path delay computation circuit 340 may compute the difference between the two path delays to determine if the relative path delay is positive or negative. A positive value may indicate that base station j or base station 120 is closer to mobile station 110 than the serving base station 130. Conversely, a negative value may indicate that base station j or base station 120 is further away from mobile station 110 than the serving base station 130. It should be understood that alternatively, a negative value may be used to indicate a base station is closer while a positive value may be used to indicate a base station is farther away.

In general terms, relative path delay computation circuit 340 may compute the relative path delay between two or more base stations in accordance with the following:

$$\Delta_j = \hat{\theta}_{j,chan} - \hat{\theta}_{0,chan}$$

where j represents a newly acquired signal from a base station other than the serving base station and $\hat{\theta}_{0,chan}$ represents the path delay associated with the serving base station. From the above equation, it can be seen that when the path delay associated with base station 120 corresponding to j is larger than the path delay associated with the serving base station, the relative phase delay is positive indicating that the serving base station is closer. Conversely, when the path delay associated with base station 130 corresponding to j is smaller than the path delay associated with the serving base station, the relative phase delay is negative indicating that the serving base station is farther away from mobile station 110.

Figure 4:
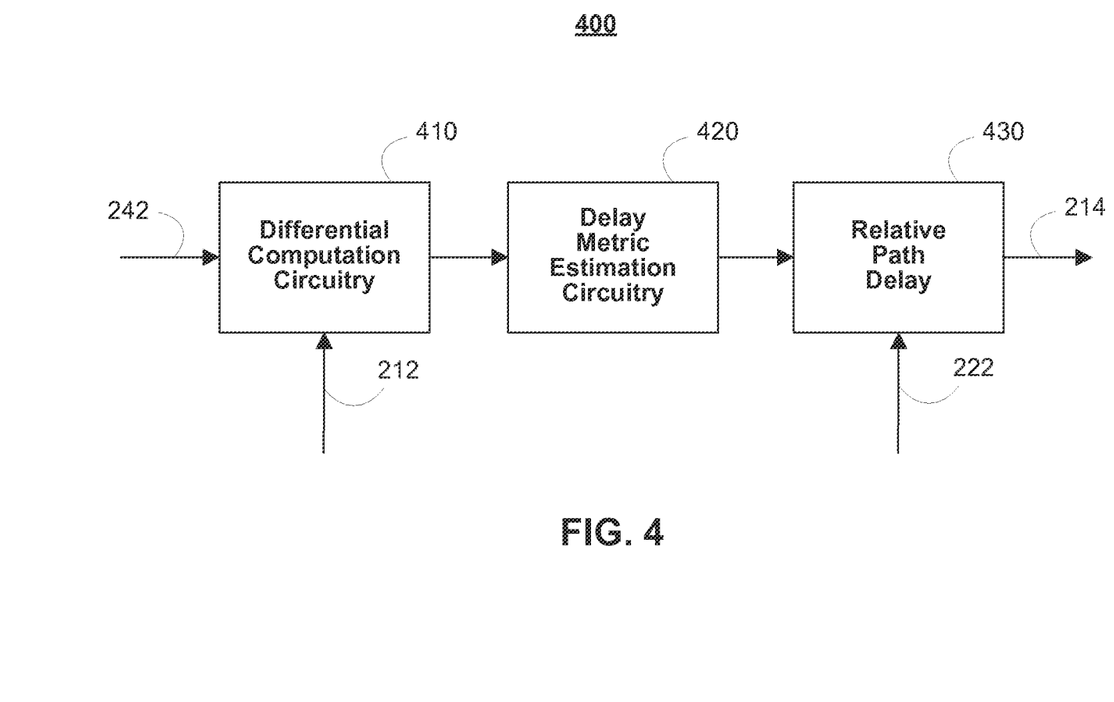

FIG. 4 is a detailed diagram of a differential based relative path delay estimation circuit 400 in accordance with an embodiment of the present invention. In some embodiments, relative path delay estimation circuit 210 computes the path delay between two or more signals using differential based relative path delay estimation circuit 400.

Differential based relative path delay estimation circuit 400 may include a differential computation circuit 410, a delay metric estimation circuit 420 and a relative path delay circuit 430. Differential computation circuit 410 receives preamble sequence 242 $Y_r[k]$ corresponding to a base station and correlates the received preamble sequence with a conjugate preamble sequence evaluated at a shifted preamble sequence index value. For example, the conjugate may be the received preamble sequence index shifted over by a value q (e.g., q is equal to three for WiMax implementations). In general, differential computation circuitry 410 may compute the differential of the received preamble sequence in accordance with the following:

$$M_r[k]=Y_r^*[k]Y_r[k+q]$$

where $M_r[k]$ is the differential of the received signal for the k-th preamble sequence index value, r is the receiver antenna (e.g., for MIMO implementations having signals received over multiple antennas) and q is the index value of the preamble sequence with which the received preamble sequence is correlated.

Differential computation circuitry 410 may receive the conjugate of the received preamble sequence Y[k] or differential computation circuitry 410 may compute the conjugate based on the received preamble sequence 242 Y[k].

Differential computation circuitry 410 also computes the differential of the transmitted signal in a similar manner as computing the differential of the received signal. Differential computation circuitry 410 receives from memory 220 (FIG. 2), the preamble sequence of the transmitted signal 212. In particular, differential computation circuitry 410 determines based on the value of j which preamble sequence is expected by retrieving the corresponding preamble sequence from memory 212. Since the standard is defined (e.g., based on WiMax standard), the preamble sequence values at different index values are known and can be compared with the received preamble sequence values.

Differential computation circuitry 410 retrieves from the memory the transmitted preamble sequence value from the memory and a conjugate preamble sequence evaluated at a shifted preamble sequence index value. Alternatively, differential computation circuitry 410 may compute the conjugate based on the transmitted preamble sequence value 212 received from the memory. Differential computation circuitry 410 correlates the transmitted preamble sequence value with the conjugate preamble sequence evaluated at a shifted preamble sequence index value.

In general, differential computation circuitry 410 may compute the differential of the transmitted preamble sequence in accordance with the following:

$$D_j[k]=X_j[k+q]X_j^*[k]$$

where $D_j[k]$ is the differential of the transmitted signal for the k-th preamble sequence index value, j is the preamble sequence associated with the base station which is known to transmit the received preamble sequence and q is the index value of the preamble sequence with which the transmitted preamble sequence is correlated.

Preferably, the preamble sequences that are correlated for the received and the transmitted preamble sequences are shifted by the same amount. In particular, when the differential is computed for the received preamble sequence, a correlation is made between the received preamble sequence and the conjugate preamble sequence evaluated at a shifted preamble sequence value q (e.g., q=3). Similarly, when the differential is computed for the transmitted preamble sequence, a correlation is made between the transmitted preamble sequence and the transmitted conjugate preamble sequence evaluated at a preamble sequence value shifted by the same amount q (i.e., q=3).

Delay metric estimation circuitry 420 computes the path delay corresponding to the base station j. Delay metric estimation circuitry 420 computes the path delay based on the differential received preamble sequence and the differential transmitted preamble sequence. Delay metric estimation circuitry 420 may compute the conjugate of the differential of the transmitted preamble sequence or may receive a conjugate of the transmitted preamble sequence computed by differential computation circuitry 410. Delay metric estimation circuitry 420 correlates the differential of the received preamble sequence with a conjugate of the differential of the transmitted preamble sequence for every antenna r and all of the set of the indices $P_j$ of subcarriers used for the preamble sequence j associated with the base station.

In general delay metric estimation circuitry 420 may compute the path delay corresponding to the base station j in accordance with the following:

$$\hat{\theta}_{j,\mathit{diff}} = -\frac{N}{2\pi q} \angle \left( \sum_{r=1}^{R} \sum_{k \in P_j} M_r[k]D_j^*[k] \right)$$

where $\hat{\theta}_{j,\mathit{diff}}$ is the path delay corresponding to base station j.

The relative path delay is computed based on the path delay computed by delay metric estimation circuit 420. Relative path delay circuit 430 computes the relative path delay in a similar manner as relative path delay circuit 340. Relative path delay computation circuit 430 receives the computed path delay associated with a particular base station (e.g., base station j or base station 120) from delay metric estimate circuit 420 and compares it with a path delay associated with another base station (e.g., a serving base station j=0 or base station 130). For example, relative path delay computation circuit 430 may compute the difference between the two path delays to determine if the relative path delay is positive or negative. A positive value may indicate that base station j or base station 120 is closer to mobile station 110 than the serving base station 130. Conversely, a negative value may indicate that base station j or base station 120 is further away from mobile station 110 than the serving base station 130. It should be understood that alternatively, a negative value may be used to indicate a base station is closer while a positive value may be used to indicate a base station is farther away.

In general terms, relative path delay computation circuit 430 may compute the relative path delay between two or more base stations in accordance with the following:

$$\Delta_j = \hat{\theta}_{j,chan} - \hat{\theta}_{0,chan}$$

where j represents a newly acquired signal from a base station 120 other than the serving base station 130 and $\hat{\theta}_{0,chan}$ represents the path delay associated with the serving base station 130.

Computing the relative path delay using the differential algorithm is less complex than computing the relative path delay using channel estimation algorithm. In particular, the relative path delay may be computed using the differential algorithm without computing the channel estimate. Additionally, in the differential algorithm, the magnitude of the correlation between the received preamble sequence correlation and the transmitted preamble sequence correlation reflects the RSSI of the received signal. Thus, it may be desirable to share the output of delay metric estimation circuitry 420 with another system component that needs the value of the RSSI of the received signal. In such a scenario, it should be understood that the output may be an intermediate step in computing the path delay and not necessarily the overall output provided to relative path delay circuit 430. In particular, delay metric estimation circuitry 420 may compute M[k]D*[k] and accumulate the value for various components (e.g., the values at different antennas and index values for k). However, the RSSI may be reflected without the accumulation and simply by computing the magnitude of M[k]D*[k]. The computed magnitude may be provided to other system components that need the RSSI value without interrupting the computation of the path delay associated with the base station.

In some implementations, the instantaneous values of the path delays associated with the base station j (whether computed using the channel estimation or differential algorithm) may be averaged (e.g., using a low-pass filter) over multiple frames. This may provide a more accurate value for the path delay. Accordingly, in such implementations, the relative path delay circuitries 340 and 430 may receive the averaged path delays instead of the instantaneous path delays computed by delay metric estimation circuitries 330 and 420. Delay metric estimation circuitries 330 and 420 may store in a memory the instantaneous values of the path delays associated with different frames of a signal received from a base station and average the stored values after a particular number of frames are received.

Figure 5:
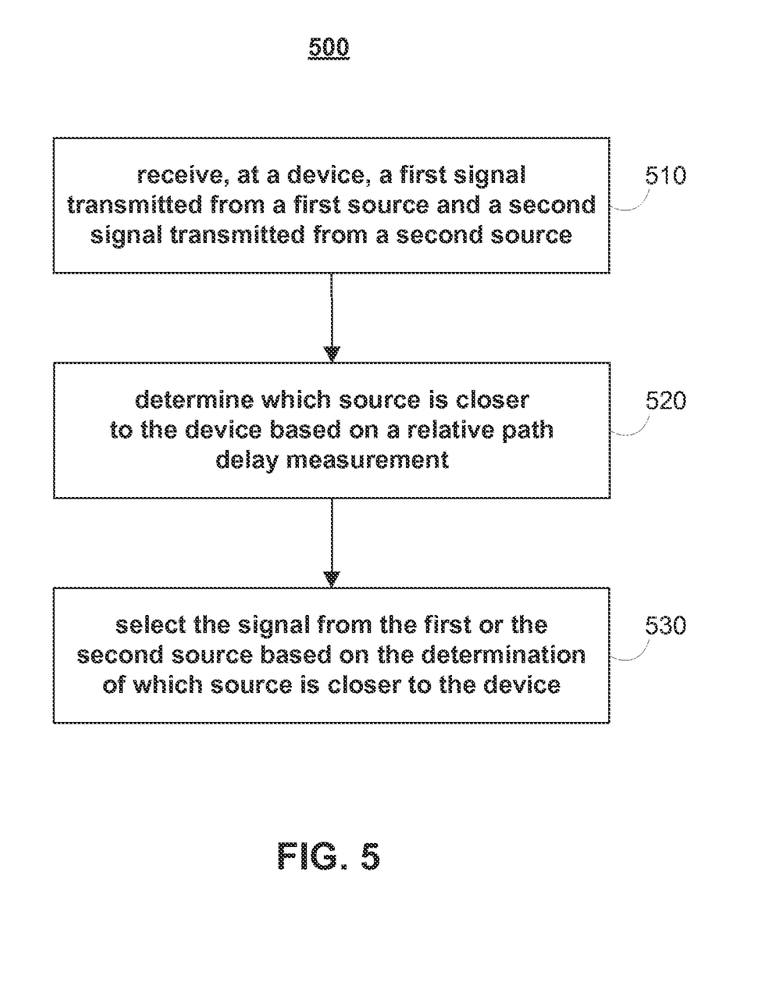
FIG. 5 illustrates a process for computing relative path delay between multiple sources in accordance with an embodiment of the present invention.

FIG. 5 illustrates a process 500 for computing relative path delay between multiple sources in accordance with an embodiment of the present invention. At step 510, a first signal transmitted from a first source and a second signal transmitted from a second source are received at a device. For example, mobile station 110 receives a first signal (e.g., a first preamble sequence) from base station 130 and a second signal (e.g., a second preamble sequence) from base station 120 (FIG. 1). Base station 130 may be the serving base station while the signal from base station 120 may be acquired at a later time (or substantially the same time).

At step 520, a determination is made as to which one of the first source and second source is closer to the device based on a relative path delay measurement. For example, mobile station 110 may compute the path delay associated with each base station. In some embodiments, mobile station may compute the path delay associated with the first base station and store it to a memory. When a signal from a second base station is received, the path delay associated with the second base station is computed and compared with the stored path delay associated with the first base station. Mobile station 110 may compute the path delay using a channel estimation based algorithm (FIG. 2) or a differential based algorithm (FIG. 3). The path delays associated with each signal are combined (e.g., by computing the difference between the path delays) and based on the combination, mobile station 110 determines which one of the base stations 120 and 130 is closer to mobile station 110.

At step 530, the signal from the first or the second source is selected based on the determination of which one of the first source and second source is closer to the device. For example, mobile device 110 may switch from one serving base station to another if it determines (based on the channel estimation algorithm or differential algorithm) that one base station is closer to mobile station 110 than the other.

Figure 6A:
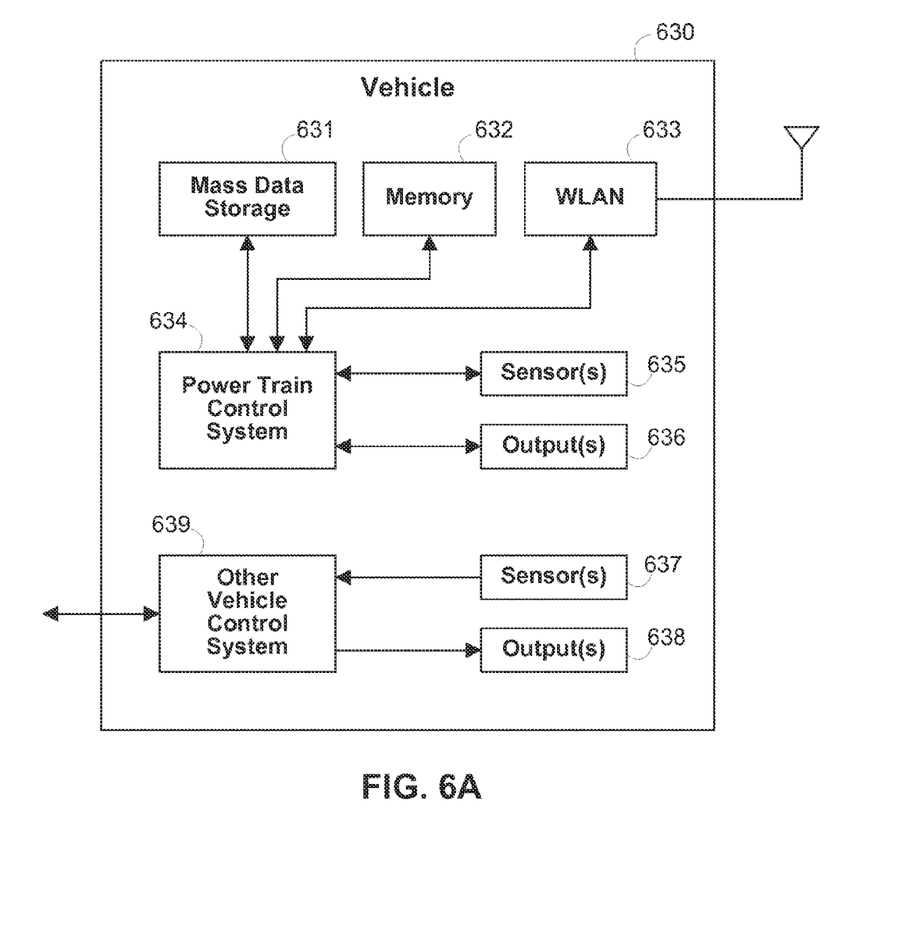
FIG. 6A is a block diagram of an exemplary vehicle that can employ the disclosed technology.
Figure 6B:
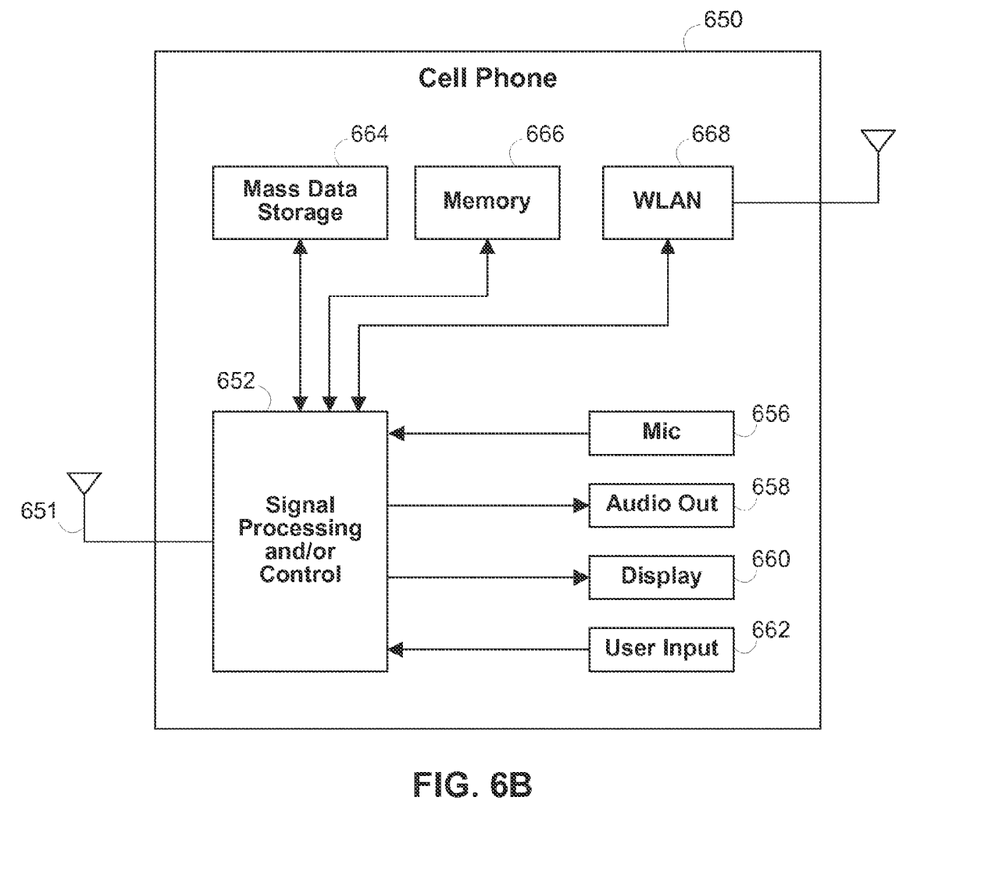
FIG. 6B is a block diagram of an exemplary cell phone that can employ the disclosed technology.
Figure 6C:
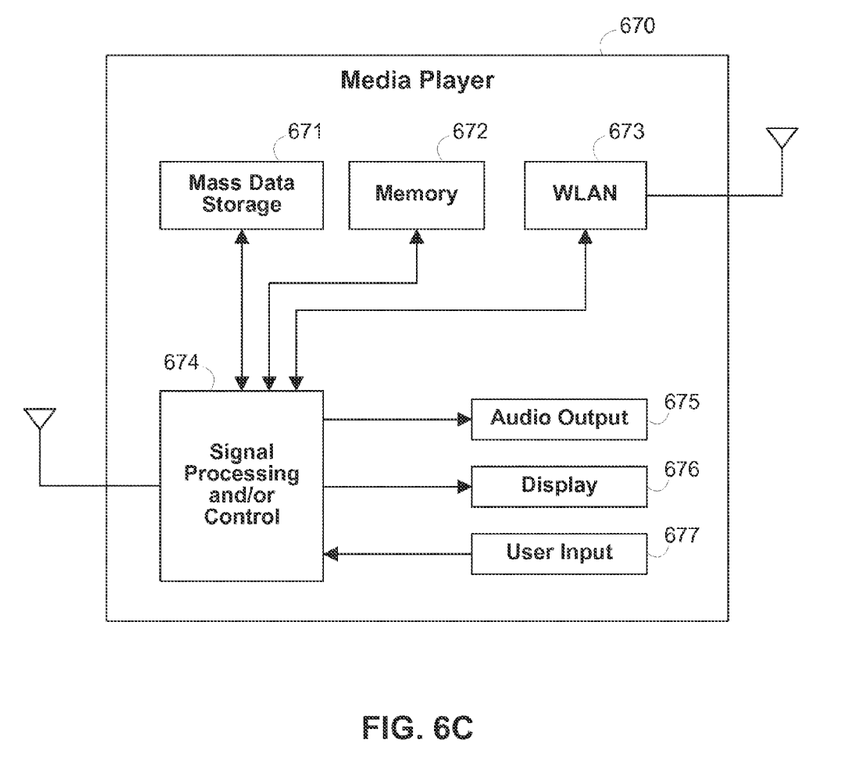
FIG. 6C is a block diagram of an exemplary media player that can employ the disclosed technology.

Referring now to FIGS. 6A-6C, various exemplary implementations of the present invention are shown.

Referring now to FIG. 6A, the present invention implements a control system of a vehicle 630, a WLAN interface and/or mass data storage of the vehicle control system. In some implementations, the present invention may implement a powertrain control system 634 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 639 of the vehicle 630. The control system 639 may likewise receive signals from input sensors 637 and/or output control signals to one or more output devices 638. In some implementations, the control system 639 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 634 may communicate with mass data storage 631 that stores data in a nonvolatile manner. The mass data storage 631 may include optical and/or magnetic storage devices for example hard disk drives HDD and/or DVDs. The HDD may be a mini HDD that includes one or more platters having a diameter that is smaller than approximately 1.8". The powertrain control system 634 may be connected to memory 632 such as RAM, ROM, low latency nonvolatile memory such as flash memory and/or other suitable electronic data storage. The powertrain control system 634 also may support connections with a WLAN via a WLAN network interface 633. The control system 639 may also include mass data storage, memory and/or a WLAN interface (all not shown).

Referring now to FIG. 6B, the present invention can be implemented in a cellular phone 650 that may include a cellular antenna 651. The present invention may implement either or both signal processing and/or control circuits, which are generally identified in FIG. 6B at 652, a WLAN interface and/or mass data storage of the cellular phone 650. In some implementations, the cellular phone 650 includes a microphone 656, an audio output 658 such as a speaker and/or audio output jack, a display 660 and/or an input device 662 such as a keypad, pointing device, voice actuation and/or other input device. The signal processing and/or control circuits 652 and/or other circuits (not shown) in the cellular phone 650 may process data, perform coding and/or encryption, perform calculations, format data and/or perform other cellular phone functions.

The cellular phone 650 may communicate with mass data storage 664 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 650 may be connected to memory 666 such as RAM, ROM, low latency nonvolatile memory such as flash memory and/or other suitable electronic data storage. The cellular phone 650 also may support connections with a WLAN via a WLAN network interface 668.

Referring now to FIG. 6C, the present invention can be implemented in a media player 670. The present invention may implement either or both signal processing and/or control circuits, which are generally identified in FIG. 6C at 674, a WLAN interface and/or mass data storage of the media player 670. In some implementations, the media player 670 includes a display 676 and/or a user input 677 such as a keypad, touchpad and the like. In some implementations, the media player 670 may employ a graphical user interface (GUI) that typically employs menus, drop down menus, icons and/or a point-and-click interface via the display 676 and/or user input 677. The media player 670 further includes an audio output 675 such as a speaker and/or audio output jack. The signal processing and/or control circuits 674 and/or other circuits (not shown) of the media player 670 may process data, perform coding and/or encryption, perform calculations, format data and/or perform any other media player function.

The media player 670 may communicate with mass data storage 671 that stores data such as compressed audio and/or video content in a nonvolatile manner. In some implementations, the compressed audio files include files that are compliant with MP3 format or other suitable compressed audio and/or video formats. The mass data storage 671 may include optical and/or magnetic storage devices for example hard disk drives HDD and/or DVDs. The HDD may be a mini HDD that includes one or more platters having a diameter that is smaller than approximately 1.8". The media player 670 may be connected to memory 672 such as RAM, ROM, low latency nonvolatile memory such as flash memory and/or other suitable electronic data storage. The media player 670 also may support connections with a WLAN via a WLAN network interface 673. Still other implementations in addition to those described above are contemplated.

The foregoing describes systems and methods for measuring relative path delay in systems having multiple transmitting devices. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implemented in software.

What is claimed is:

1. A method comprising:
    receiving, at a device, a first signal transmitted from a first source and a second signal transmitted from a second source;
    computing a first relative path delay measurement associated with the first source based on at least one of (1) a channel estimate of the first source and (2) a differential of the first signal transmitted from the first source;
    computing a second relative path delay measurement associated with the second source based on at least one of (1) a channel estimate of the second source and (2) a differential of the second signal transmitted from the second source;
    comparing the first and second relative path delay measurements; and
    selecting the corresponding signal from the first or the second source based on the comparison.

2. The method of claim 1 wherein the respective signals transmitted from the first and second sources are synchronized.

3. The method of claim 1 wherein the first and second sources are base stations and the device is a mobile station.

4. The method of claim 1 wherein the comparing is performed to determine which one of the first source and the second source is closer to the device and wherein the selecting selects based on the determination of which one of the first source and the second source is closer to the device.

5. The method of claim 1 wherein each of the first source and the second source is associated with a distinct preamble Orthogonal Frequency Division Multiplexing (OFDM) symbol.

6. The method of claim 1, wherein the first and second relative path delay measurements are computed based on channel estimates that correspond to the respective first and second sources, and wherein the channel estimates are computed using respective preamble sequences associated with the first and second sources, further comprising:
    measuring a first phase angle that corresponds to the first source based on the channel estimate associated with the first source; and
    measuring a second phase angle that corresponds to the second source based on the channel estimate associated with the second source.

7. The method of claim 6, wherein the comparing comprises computing a difference between the first and the second phase angles to determine which one of the first source and the second source is closer to the device.

8. The method of claim 6 wherein the channel estimates are computed in accordance with a maximum likelihood (ML) algorithm.

9. The method of claim 1, wherein the first and second relative path delay measurements are computed based on differentials of the respective signals transmitted from the first and second sources and differentials of the respective signals received from the first and second sources, further comprising:
    estimating a first phase angle that corresponds to the first source based on the differentials of the signals transmitted from the first source and received from the first source; and
    estimating a second phase angle that corresponds to the second source based on the differentials of the signals transmitted from the second source and received from the second source.

10. A device comprising:
    a receiver configured to receive a first signal transmitted from a first source and a second signal transmitted from a second source; and
    control circuitry configured to:
        compute a first relative path delay measurement associated with the first source based on at least one of (1) a channel estimate of the first source and (2) a differential of the first signal transmitted from the first source;
        compute a second relative path delay measurement associated with the second source based on at least one of (1) a channel estimate of the second source and (2) a differential of the second signal transmitted from the second source;
        compare the first and second relative path delay measurements; and
        select the corresponding signal from the first or the second source based on the comparison.

11. The device of claim 10 wherein the respective signals transmitted from the first and second sources are synchronized.

12. The device of claim 10 wherein the first and second sources are base stations and the device is a mobile station.

13. The device of claim 10 wherein the comparison is performed to determine which one of the first source and the second source is closer to the device and wherein the selection is performed based on the determination of which one of the first source and the second source is closer to the device.

14. The device of claim 10 wherein each of the first source and the second source is associated with a distinct preamble Orthogonal Frequency Division Multiplexing (OFDM) symbol.

15. The device of claim 10, wherein the first and second relative path delay measurements are computed based on channel estimates that correspond to the respective first and second sources, wherein the channel estimates are computed using respective preamble sequences associated with the first and second sources, wherein the control circuitry is further configured to:

measure a first phase angle that corresponds to the first source based on the channel estimate associated with the first source; and measure a second phase angle that corresponds to the second source based on the channel estimate associated with the second source.

16. The device of claim 15, wherein the control circuitry is further configured to compute a difference between the first and the second phase angles to determine which one of the first source and the second source is closer to the device.

17. The device of claim 15 wherein the channel estimates are computed in accordance with a maximum likelihood (ML) algorithm.

18. The device of claim 10, wherein the first and second relative path delay measurements are computed based on differentials of the respective signals transmitted from the first and second sources and differentials of the respective signals received from the first and second sources, and wherein the control circuitry is further configured to:

estimate a first phase angle that corresponds to the first source based on the differentials of the signals transmitted from the first source and received from the first source; and estimate a second phase angle that corresponds to the second source based on the differentials of the signals transmitted from the second source and received from the second source.

19. A system comprising:

a base station configured to transmit a first signal to a mobile device; wherein the mobile device is configured to:

receive a second signal transmitted from a serving station different from the base station;

compute a first relative path delay measurement associated with the base station based on at least one of (1) a channel estimate of the base station and (2) a differential of the first signal transmitted from the base station;

compute a second relative path delay measurement associated with the serving station based on at least one of (1) a channel estimate of the serving station and (2) a differential of the second signal transmitted from the serving station;

compare the first and second relative path delay measurements; and select the corresponding signal from the base station or the serving station based on the comparison.

20. The system of claim 19, wherein the mobile device is configured to switch receiving signals from the serving station to the base station.

* * * * *